United States Patent
Cheng et al.

(10) Patent No.: US 6,354,395 B1
(45) Date of Patent: Mar. 12, 2002

(54) DELASHED WORM GEAR ASSEMBLY AND ELECTRIC POWER ASSIST APPARATUS

(75) Inventors: Wangquan Winston Cheng, Troy; Kevin Harley Marseilles, Frankenmuth; Aly Ahmed Badawy, Saginaw, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/467,223

(22) Filed: Dec. 20, 1999

Related U.S. Application Data

(63) Continuation-in-part of application No. 08/905,880, filed on Aug. 4, 1997, now abandoned.

(51) Int. Cl.$^7$ .............................................. B62D 5/04
(52) U.S. Cl. ......................... 180/444; 74/409; 74/425; 74/440; 74/458
(58) Field of Search ..................... 74/440, 425, 458, 74/409; 180/407, 412, 443, 444

(56) References Cited

U.S. PATENT DOCUMENTS

| | | | | |
|---|---|---|---|---|
| 3,535,948 A | * | 10/1970 | Winzeler et al. | .............. 74/440 |
| 4,979,404 A | * | 12/1990 | Nakata et al. | ................ 74/409 |
| 6,076,628 A | * | 6/2000 | Pattok et al. | ............... 180/444 |

FOREIGN PATENT DOCUMENTS

| | | | | |
|---|---|---|---|---|
| DE | 544445 | * | 2/1932 | ................ 74/440 |
| DE | 3803700 | * | 8/1989 | ................ 74/440 |
| FR | 723916 | * | 5/1990 | ................ 74/440 |
| GB | 2224805 | * | 5/1990 | ................ 74/440 |
| JP | 80563 | * | 5/1984 | ................ 74/440 |

OTHER PUBLICATIONS

P. Arseneault and R.A. Bement, "Antibacklash Gear", IBM Technical Disclosure Bulletin, vol. 14, No. 5, p. 1447, Oct. 1971.*

Lynwander, Peter, Gear Drive Systems Design and Application, American Lohmann Corporation, Marcel Dekker, Inc. 1983.

Townsend, Dennis P., Dudley's Gear Handbook, Lewis Research Center, NASA, McGraw–Hill, Inc. Second Edition, undated.

Gutmann, Fredrick T., 18 Ways to Control Backlash in Gearing, Product Engineering, Oct. 26, 1959.

* cited by examiner

Primary Examiner—Daniel G. DePumpo
(74) Attorney, Agent, or Firm—Edmund P. Anderson

(57) ABSTRACT

An electric power assist apparatus for motor vehicle power steering including an electric motor and a speed reducer. The speed reducer includes a worm and a molded plastic worm gear on an output shaft of the speed reducer. The polymer from which the worm gear and the integral worm gear teeth thereon is molded has substantial structural rigidity after becoming cured. A plastic tooth ring is insert molded on the worm gear from a polymer having substantially greater resilience after becoming cured. The plastic tooth ring includes a plurality of resiliently flexible gear teeth having flanks which circumferentially overlap the flanks of the worm gear teeth. When the electric motor is off, the gear teeth on the worm mesh with the resiliently flexible gear teeth on the tooth ring with zero clearance to suppress noise attributable to rattling between the worm and resilient flexure of the flexible gear teeth on the tooth ring until the worm teeth engage the structurally more rigid worm gear teeth.

11 Claims, 4 Drawing Sheets

DELASHED WORM GEAR ASSEMBLY AND ELECTRIC POWER ASSIST APPARATUS

PRIOR HISTORY

This application is a continuation-in-part of U.S. Ser. No. 08/905,880, entitled ELECTRIC POWER ASSIST APPARATUS, filed Aug. 4, 1997 now abandoned.

TECHNICAL FIELD

This invention relates to an electric power assist apparatus for motor vehicle steering.

BACKGROUND OF THE INVENTION

A motor vehicle steering apparatus typically includes a steering gear connected to dirigible wheels of the motor vehicle, a steering shaft connected to the steering gear and rotatable on a steering column of the motor vehicle, and a steering hand wheel on the steering shaft where manual effort is applied to steer the motor vehicle by rotating the steering shaft. To reduce the manual effort required to rotate the steering shaft, the steering apparatus may further include an electric power assist apparatus including an electric motor and a speed reducer consisting of a housing attached to the steering column, a worm driven by the electric motor, and a worm gear on an output shaft of the speed reducer interposed between the steering shaft and the steering gear. Dimensional clearance between the worm and the worm gear necessary for low friction operation, even when optimized as described in U.S. Ser. No. 08/803,463, filed Feb. 20, 1997, and assigned to the assignee of this invention, may manifest itself when the electric motor is off as perceptible noise attributable to rattling of gear teeth on the worm gear against gear teeth on the worm induced by vibration of the speed reducer housing. An electric power assist apparatus according to this invention is a novel alternative to the electric power assist apparatus described in the aforesaid U.S. Ser. No. 08/803,463.

Gutmann, F. T., 18 *Ways to Control Backlash In Gearing*, Product Engineering (Oct. 26, 1959), pp. 71–75, discloses eighteen classic mechanisms for reducing backlash and rattle for a variety of gear configurations, including wormgear and bevel-gear assemblies.

Enveloping gears are well known in the gear art and are discussed in detail in Townsend, D. P., *Dudley's Gear Handbook, Second Edition*, McGraw Hill (1991), Chapters 2 and 4.

Involute curves and gears are also long known in the gear art and are discussed in detail in Lynwander, P., *Gear Drive Systems*, Marcel Dekker, Inc, (New York 1983), pp. 23 to 25.

Totten, D., GB 2,224,805A, entitled *GEAR ANTI-RATTLE DEVICE*, published May 16, 1990, describes a gear train anti-rattle device in the form of an elastomeric extension 21 applied to a standard steel gear, the extension having teeth of substantially the same profile, but slightly oversized relative to the gear teeth to occupy the backlash space between a pair of meshing gears. This elastomeric material acts to absorb vibrational energy and reduce or eliminate the impact noise normally developed when the gears are subjected to oscillatory torque and to deform the extension teeth when a predetermined level of mean torque is reached.

The major problem with solutions like Totten is that the plastic gear teeth are compressed or sheared, thereby resulting high wear and tear and rapid deterioration. This is not suitable for automotive applications that require components last about ten, if not twenty, years of nearly continuous use.

SUMMARY OF THE INVENTION

This invention is a new and improved electric power assist apparatus for motor vehicle power steering including an electric motor and a speed reducer. The speed reducer includes a worm driven by the electric motor and a molded plastic worm gear on an output shaft of the speed reducer having gear teeth meshing with gear teeth on the worm. The polymer from which the worm gear is molded has substantial structural rigidity, and the integrally molded gear teeth thereon are modified "envelope" gear teeth each having a crest flush with an outer cylindrical wall of the worm and a pair of flanks which diverge from each other for maximum tooth rigidity from a narrow flat end in the plane of a first side of the worm gear to a wide flat end in the plane of a second side of the worm gear. A plastic tooth ring is insert molded on the worm gear over the narrow flat ends of the modified envelope gear teeth from a polymer having substantially greater resilience than the polymer from which the worm gear is molded. The plastic tooth ring includes a plurality of resiliently flexible gear teeth having flanks which circumferentially overlap the flanks of the modified envelope gear teeth. When the electric motor is off, the gear teeth on the worm mesh with the resiliently flexible gear teeth on the tooth ring with zero clearance therebetween to eliminate rattling between the gear teeth on the worm and on the worm gear. When the electric motor is on, the worm teeth induce resilient flexure of the flexible gear teeth on the tooth ring until the worm teeth engage the structurally more rigid modified envelope gear teeth on the worm gear for torque transfer between the worm and the worm gear.

DESCRIPTION OF THE PREFERRED EMBODIMENT

Figure 1:
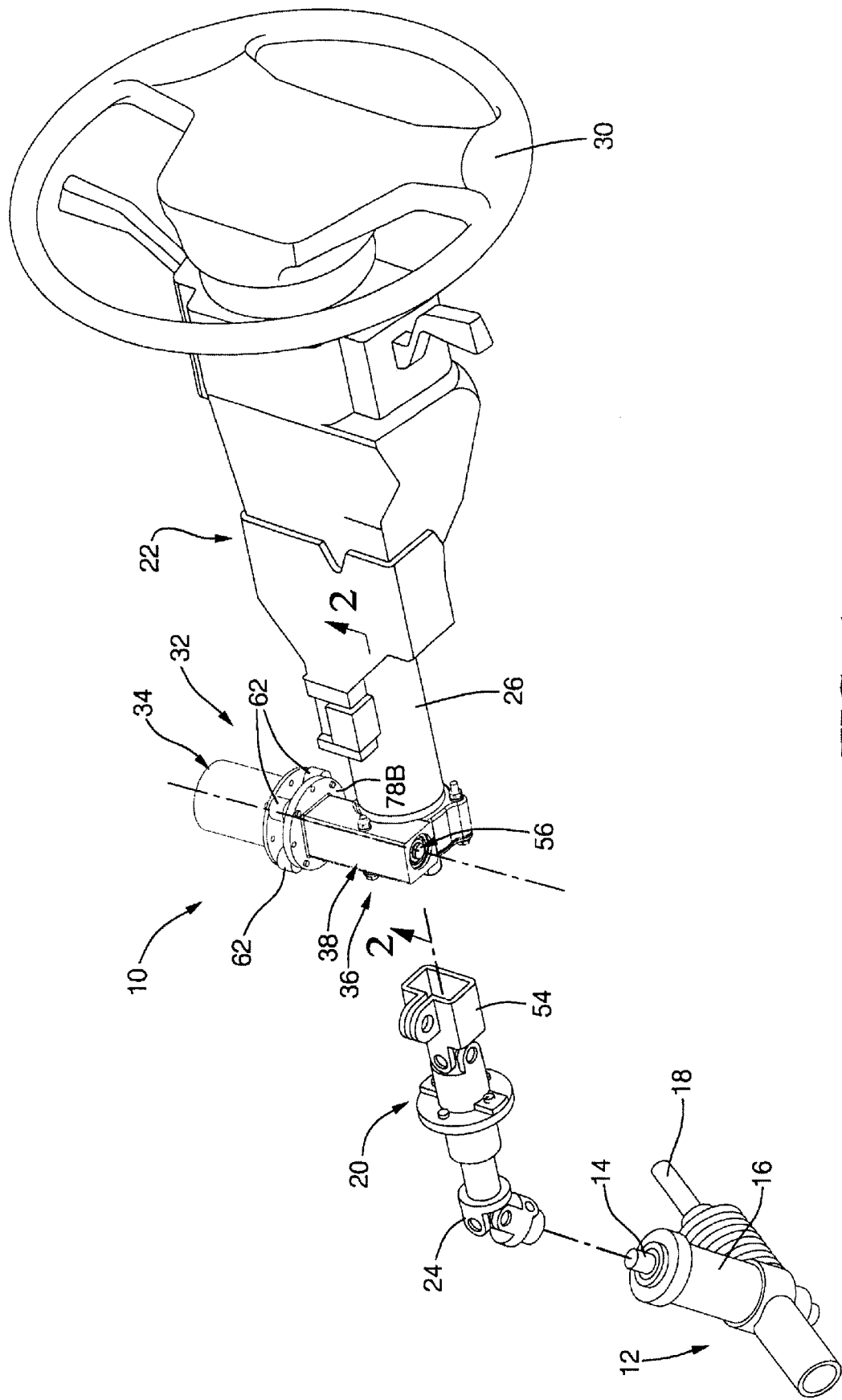
FIG. 1 is a perspective view of a motor vehicle steering apparatus including an electric power assist apparatus according to this invention.

Referring to FIG. 1, a motor vehicle steering apparatus 10 includes a steering gear 12 having an input shaft 14 rotatably supported on a housing 16 of the steering gear and a rack bar 18 supported on the housing 16 for back and forth linear translation in response to rotation of the input shaft. Opposite ends, not shown, of the rack bar are linked to dirigible wheels of the motor vehicle for steering the vehicle in the usual fashion in response to rotation of the input shaft 14. An intermediate steering shaft 20 of the steering apparatus 10 between the steering gear input shaft 14 and a steering column 22 of the steering apparatus is connected to the steering gear input shaft 14 through a first universal joint 24.

The steering column 22 is rigidly supported on a body structure, not shown, of the motor vehicle and includes a generally tubular mast jacket. A steering shaft 28 (FIG. 2) is rotatably supported on the steering column 22 within the mast jacket 26. A steering hand wheel 30 is rigidly attached to the steering shaft for rotation as a unit therewith. An electric power assist apparatus 32 according to this invention is disposed between the steering shaft 28 and the intermediate steering shaft 20.

Figure 2:
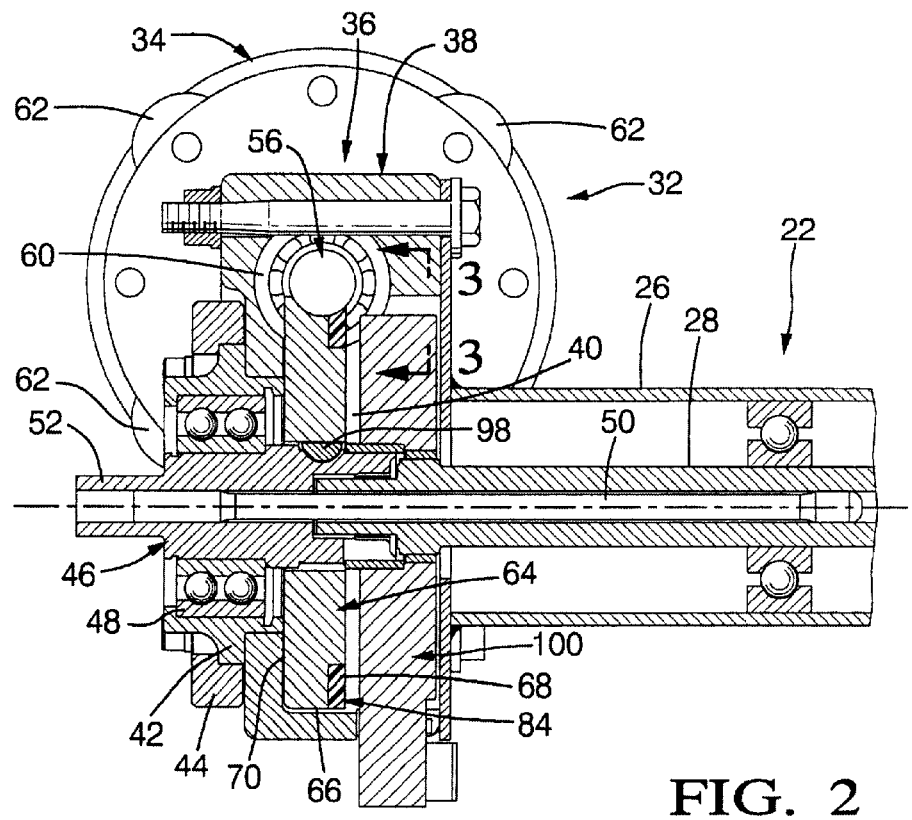
FIG. 2 is a sectional view taken generally along the plane indicated by lines 2—2 in FIG. 1.

Referring to FIG. 2, the electric power assist apparatus 32 includes an electric motor 34 and a speed reducer 36. The speed reducer 36 includes a housing 38 having an internal chamber 40 and a bearing carrier 42 clamped to the housing 38 by a clamp ring 44. The speed reducer housing is welded to the steering column 22 at the bottom of the tubular mast jacket 26.

An output shaft 46 of the speed reducer 36 is rotatably supported on the bearing carrier 42 by a double row ball bearing 48. The speed reducer output shaft 46 is connected to the steering shaft 28 by a torsion bar 50. An outboard or lower end 52 of the speed reducer output shaft is connected to the intermediate steering shaft 20 by a second universal joint 54 so that rotation of the steering shaft 28 and the speed reducer output shaft 46 induces corresponding rotation of the steering gear input shaft 14. The speed reducer output shaft may be connected directly to the steering gear input shaft.

Figure 3:
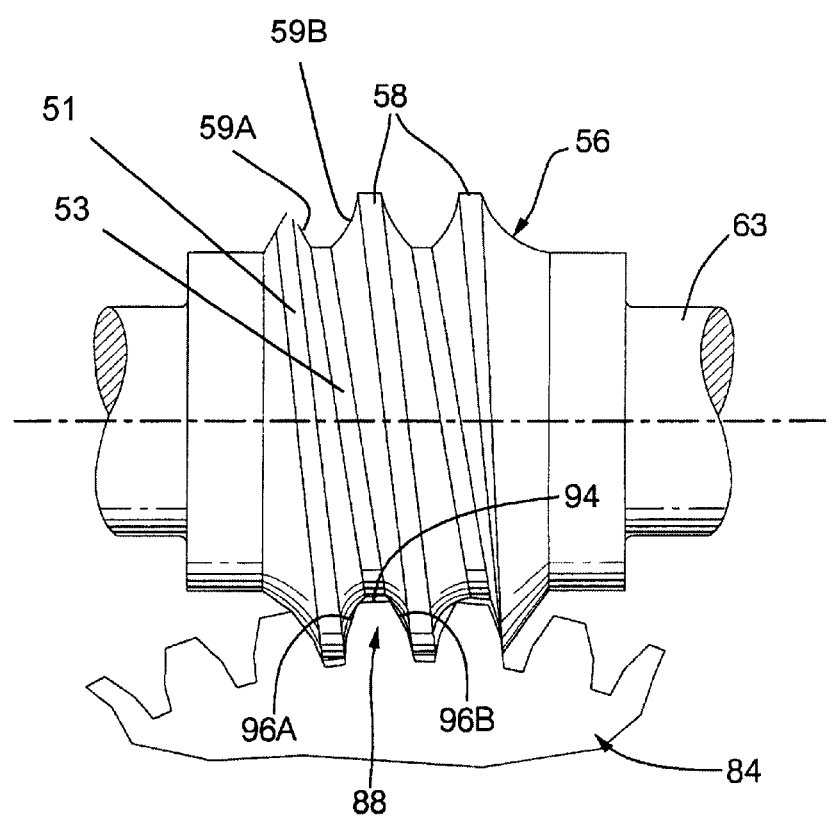
FIG. 3 is an enlarged view taken generally along the plane indicated by lines 3—3 in FIG. 2.

As seen best in FIGS. 1–3, a worm 56 of the speed reducer 36 has a spiral ridge, known as a "start" 51, that defines a spiral groove 53 and defines a plurality of gear teeth 58 on the worm. The worm 56 is rotatably supported on the speed reducer housing 38 by a plurality of bearings including a ball bearing 60. The gear teeth define walls, or flanks 59A, 59B, that receive the teeth 88 of the worm gear (FIG. 4) and tooth ring 84. The electric motor 34 is mounted on the speed reducer housing 38 through a plurality of vibration isolators 62 and drives the worm 56 through a drive shaft 63 of the electric motor connected to the worm.

Figure 4:
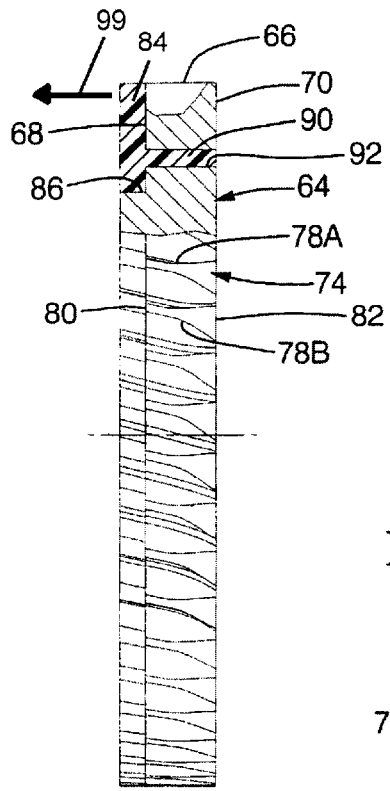
FIG. 4 is a partially broken-away view of a worm gear of a speed reducer of the electric power assist apparatus according to this invention.
Figure 5:
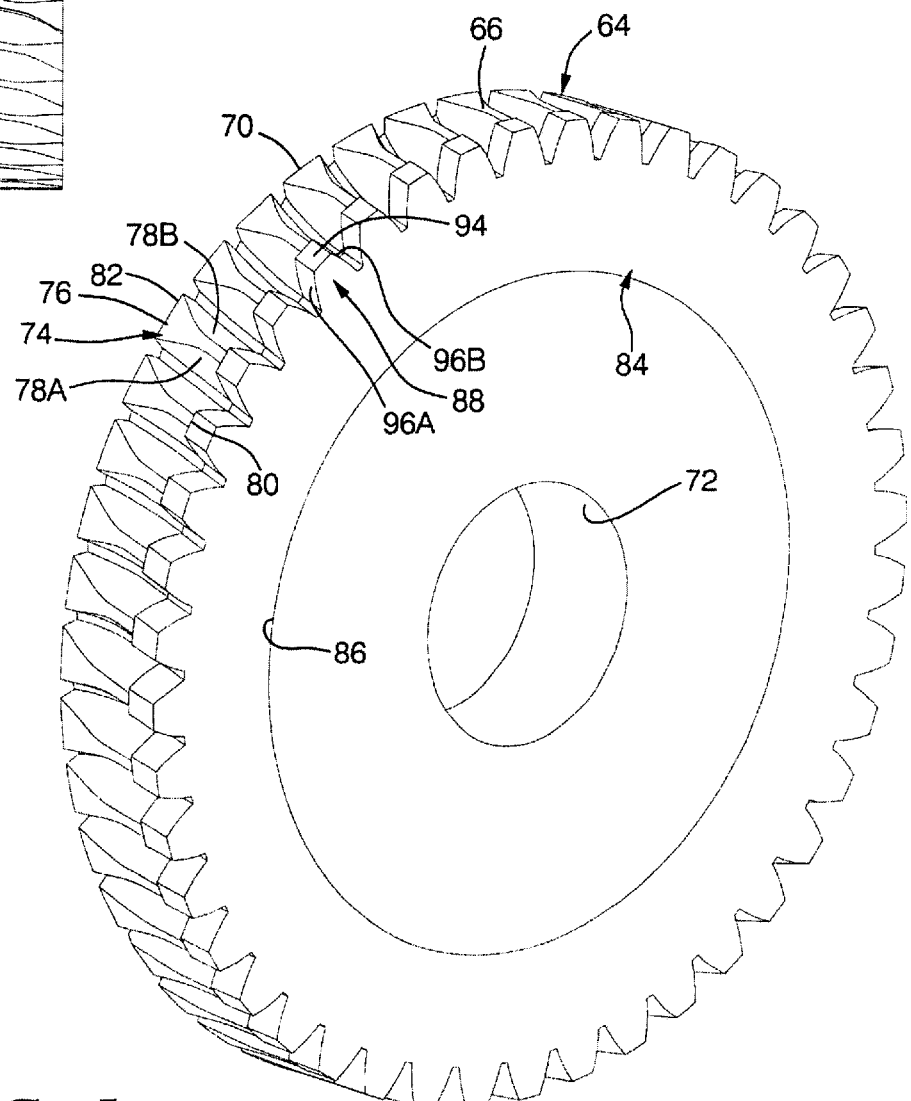
FIG. 5 is a perspective view of the worm gear of the speed reducer of the electric power assist apparatus according to this invention.
Figure 6:
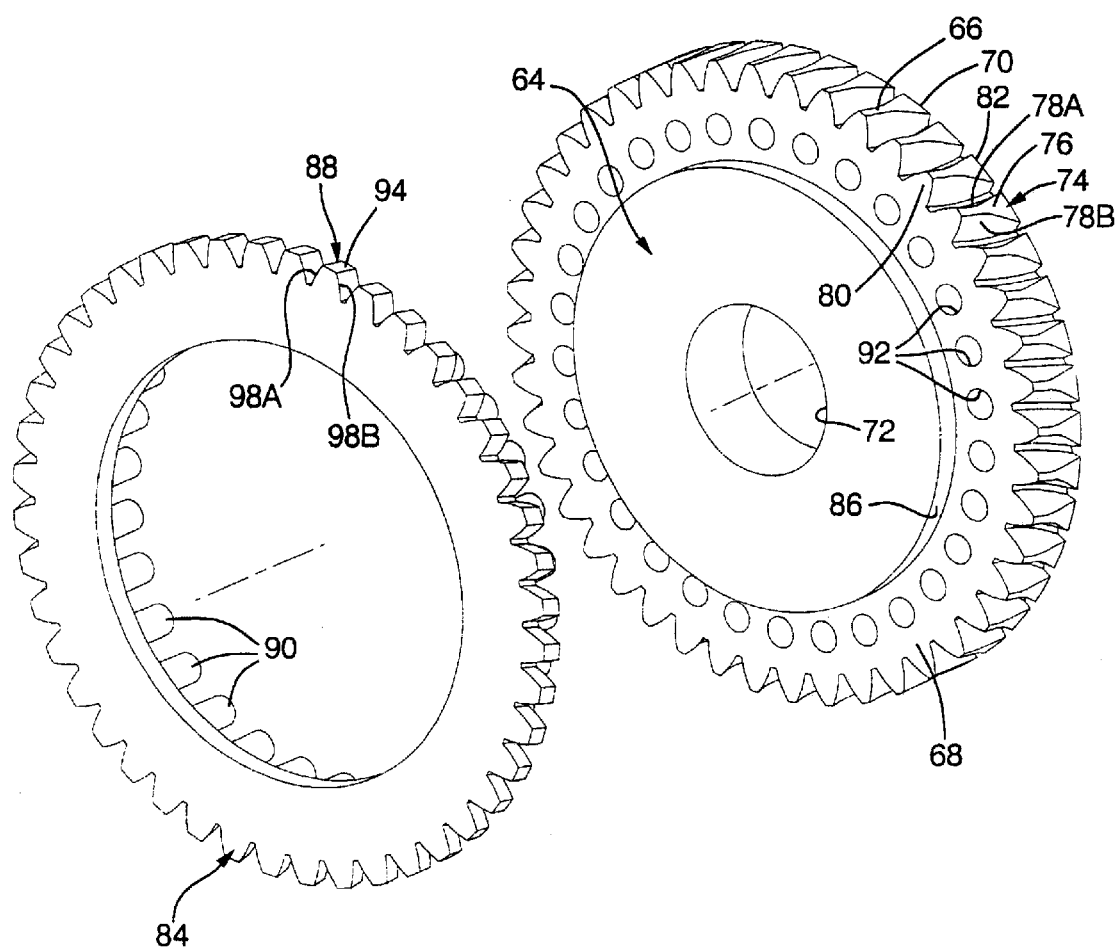
FIG. 6 is an exploded perspective view of the worm gear of the speed reducer of the electric power assist apparatus according to this invention.

As seen best in FIGS. 4–6, a disc-shaped worm gear 64 of the speed reducer 36 is molded to finished shape from a polymer that preferably exhibits substantial structural rigidity after becoming cured. There are many polymers that fit this description that are known in the art. Polyamides, such as those known as nylon and nylon 6 are suitable candidates, but many other polymers are currently available that the practitioner may use to suit the conditions under which the device is expected to operate. The worm gear 64 has a cylindrical outer wall 66, a first flat side 68 in a plane perpendicular to the outer wall 66, a second flat side 70 parallel to the first flat side, and a passage 72 through the middle of the worm gear. A plurality of modified "envelope" gear teeth 74 are molded integrally on the worm gear. Each modified envelope gear tooth 74 includes a crest 76 flush with the cylindrical outer wall 66 and a pair of flanks 78A, 78B which diverge across the worm gear from a narrow flat end 80 of the gear tooth in the plane of the first flat side 68 of the worm gear to a wide flat end 82 in the plane of the second flat side 70 of the worm gear. The diverging flanks 78A, 78B of the modified envelope gear teeth 74 maximize the rigidity of the modified envelope gear teeth in the circumferential direction of the worm gear.

The term "envelope" gear in the art refers to gear teeth that envelope one another. In the worm art, "single-enveloping gears" are those where one gear (usually the worm gear) is throated to tend to wrap around the other. "Double-enveloping" gears refer to those where both worm gear and worm are throated to tend to wrap around one another. It is also advantageous and preferred that the shape of each tooth nearly completely fills the available space allowed it by the other gear, thereby resulting in the maximum surface area contact between the teeth of the two gears. In the embodiment shown in the drawings, the spiral groove of the worm allows the teeth on the worm gear to be wider near the flat sides than in the center. A detailed discussion of enveloping gears can be found in *Dudley's Gear Handbook*. Additionally, it is preferred that the spiral start 51 have involute flanks 59A, 59B (FIG. 3) so as to maintain maximum contact with each worm tooth as it enters, passes through, and exits the mesh. A detailed discussion of involute gear teeth is found in *Gear Drive Systems*, by Peter Lynwander. Though such envelope teeth and involute starts are preferred, they are not required for this invention.

The worm gear teeth of the invention are "modified" in the sense that they are cut short on one side to make way for a resilient tooth ring as described below.

A plastic tooth ring 84 is preferably insert molded on the worm gear 64 (i.e., is molded in a mold cavity partially formed by the worm gear 64), It is preferred that the tooth ring 84 be molded from a plastic that exhibits substantially more resilient flexibility after becoming cured than does the polymer from which the worm gear 64 is molded. The plastic tooth ring 84 is insert molded on the worm gear flush against the first flat side 68 of the latter and around a cylindrical shoulder 86 thereon and includes a plurality of resiliently flexible gear teeth 88 and a plurality of integral lugs 90 in a corresponding plurality of cylindrical sockets 92 in the worm gear. The lugs 90 rigidly connect the tooth ring 84 to the worm gear 64. Each gear tooth 88 on the tooth ring 84 abuts the narrow flat end 80 of a corresponding one of the modified envelope gear teeth 74 on the worm gear and includes a crest 94 flush with the crest 76 of the corresponding modified envelope gear tooth and a pair of flanks 96A, 96B which circumferentially overlap the flanks 78A, 78B of the corresponding modified envelope gear tooth in the plane of the first flat side 68 of the worm gear.

The passage 72 in the worm gear 64 is received closely around the speed reducer output shaft 46 in the internal chamber 40 of the speed reducer housing 38 and the worm gear is coupled to the speed reducer output shaft for unitary rotation by a key 98. The gear teeth 58 on the worm 56 mesh with the modified envelope gear teeth 74 on the worm gear 64 and with the resiliently flexible gear teeth 88 on the tooth ring 84. In the absence of manual effort applied at the steering hand wheel 30, the torsion bar 50 establishes a center position of the steering shaft 28 relative to the speed reducer output shaft 46. A schematically-represented torque sensor 100 in the internal chamber 40 of the speed reducer housing monitors the relative positions of the steering shaft 28 and the speed reducer output shaft 46 and provides an electronic signal to a control module, not shown, of the motor vehicle which turns off the electric motor in the center position of the steering shaft 28.

When the electric motor 34 is off, the flanks 96A, 96B of the 10 resiliently flexible gear teeth 88 on tooth ring 84 engage the gear teeth 58 on the worm 56 with zero dimensional clearance, i.e., lash, therebetween to effectively resiliently suspend the worm teeth 58 midway between the flanks 78A, 78B of corresponding ones of the modified envelope gear teeth 74 on the worm gear. With the flanks 78A, 78B of the modified envelope gear teeth on the worm gear thus separated from the worm teeth 58, noise attributable to rattle between the worm teeth and the modified envelope gear teeth induced by vibration of the speed reducer housing 38 is effectively suppressed.

When manual effort is applied at the steering hand wheel 30 to steer the motor vehicle, the steering shaft 28 rotates relative to the speed reducer output shaft 46 because of resistance to rotation of the speed reducer output shaft attributable to the dirigible wheels of the motor vehicle. The corresponding twist of the torsion bar induces a restoring force urging the steering shaft back to its center position. At the same time, the torque sensor 100 signals to the aforesaid control module the direction and magnitude of rotation of the steering shaft from its center position and the control module turns on the electric motor 34 in the appropriate direction.

In the latter circumstance, the output torque of the electric motor applied to the resiliently flexible gear teeth 88 on the tooth ring 84 by the worm teeth 58 induces resilient flexure of the gear teeth 88 until the worm teeth engage one of the flanks 78A, 78B of the modified envelope gear teeth 74 on the worm gear in accordance with the direction of rotation of the worm. The flexible teeth 88 will flex primarily outward, meaning away from the worm 56 in the direction of the worm gear axis, as shown by the arrow labeled 99 in FIG. 4. By flexing outwardly, the plastic teeth 88 get out of the way of the advancing worm flanks (59A or 59B, depending on which way the worm is turning), so as to enable the advancing worm flanks to directly engage the retreating worm gear flanks, 96A or 96B. This is superior over prior art methods that rely on compression or deformational shearing of the plastic teeth, because the present invention allows the plastic teeth to simply move out of the way of the advancing teeth with minimal wear and tear.

With the worm teeth 58 thus directly engaging the structurally more rigid modified envelope gear teeth 74, torque is efficiently transferred from the worm 56 through the worm gear 64 to the speed reducer output shaft 46 to supplement the manual effort transferred to the speed reducer output shaft through the torsion bar. When manual effort at the steering hand wheel ceases, the torsion bar 50 returns the steering shaft 28 to its center position and the torque sensor signals the electronic control module to turn off the electric motor. With the electric motor off, the resiliently flexible gear teeth 88 on the tooth ring 84 return the worm teeth 58 to positions suspended between the flanks 78A, 78B of the modified envelope gear teeth 74 as described above.

What is claimed is:

1. A delashed worm gear assembly comprising:
   a worm gear having a plurality of worm gear teeth, said plurality of worm gear teeth each including a pair of diverging flanks, said diverging flanks diverging from a first side of said worm gear to a second side of said worm gear;
   a tooth ring attached to said worm gear, said tooth ring having flexible gear teeth, said flexible gear teeth on said tooth ring contacting said worm gear teeth along a plane defined by said first side of said worm gear, said resiliently flexible gear teeth being adapted to flex axially of said worm gear and out of a plane defined by said first side of said worm gear to a position spaced from and out of contact with said worm gear teeth when worm teeth on a separate worm are being driven to engage with said worm gear teeth.

2. The apparatus of claim 1 further comprising:
   a housing;
   an electric motor on said housing having a drive shaft, said worm being disposed on said housing and being rotatable by said drive shaft;
   an output shaft rotatably supported on said housing; and
   said worm gear being rotatable as a unit with said output shaft.

3. The apparatus of claim 2 wherein:
   said output shaft is mechanically linked to steering gear that translates torque in said output shaft to linear force in a rack bar.

4. The apparatus of claim 3 wherein:
   said output shaft is also mechanically linked to a steering wheel via a torsion bar.

5. A delashed worm gear assembly comprising:
   a worm gear having a plurality of worm gear teeth, said worm gear teeth including a pair of diverging flanks, said diverging flanks diverging axially from a first flat side of said worm gear to a second flat side of said worm gear;
   a plastic tooth ring attached to said worm gear flush against said first flat side, said plastic tooth ring having a plurality of resiliently flexible gear teeth, said plurality of resiliently flexible gear teeth contacting said worm gear teeth, and overlapping with said pair of diverging flanks of said worm gear teeth, said plurality of resiliently flexible gear teeth being adapted to flex to a position axially spaced from and out of contact with said gear teeth when said worm gear is driven by a separate worm, and wherein when said separate worm is at rest said resiliently flexible gear teeth suspend teeth of said worm between said pair of diverging flanks of said worm gear teeth.

6. A delashed worm gear assembly as claimed in claim 5 wherein said plurality of worm gear teeth each include a narrow end of the gear tooth in the plane of the first flat side of the worm gear, and a wide end of the gear tooth in the plane of the second flat side of the worm gear.

7. A delashed worm gear assembly as claimed in claim 5 wherein said worm gear includes a cylindrical outer wall substantially perpendicular to the plane of the first flat side of the worm gear and the plane of the second flat side of the worm gear, said first flat side being substantially parallel to said second flat side.

8. A worm gear assembly comprising:
   a worm having worm teeth;
   a worm gear in operable communication with said worm, said worm gear having a flat side;
   a plurality of worm gear teeth on said worm gear meshing with said worm teeth on said worm, each of said plurality of worm gear teeth having a pair of flanks, and each of said plurality of worm gear teeth having an end in the plane of said flat side of said worm gear;
   a tooth ring attached to said worm gear flush against said flat side of said worm gear, said tooth ring comprising a material exhibiting resilient flexibility;
   a plurality of resiliently flexible gear teeth on said tooth ring each having a pair of flanks circumferentially overlapping corresponding ones of said pair of flanks of said worm gear teeth on said worm gear so that said worm teeth mesh with said resiliently flexible gear teeth on said tooth ring without clearance therebetween, said worm teeth being resiliently suspended between said flanks of adjacent pairs of said worm gear teeth for noise suppression when said worm is not being driven to mesh with said worm gear teeth, said resiliently flexible gear teeth on said tooth ring having resilient flexure to substantially axially deflect out of the plane of said flat side of said worm gear, wherein said worm gear teeth are modified envelope gear teeth each including a pair of flanks which diverge from said end in the plane of said flat side of said worm gear to a relatively wider end in a plane of a second flat side of said worm gear.

9. A worm gear assembly as claimed in claim 8 wherein said plastic tooth ring is insert molded on said worm gear.

10. A worm gear assembly as claimed in claim 9 wherein said insert molded plastic tooth ring is rigidly attached to said worm gear by a plurality of integral lugs disposed in respective ones of a plurality of sockets in said worm gear.

11. A worm gear assembly as claimed in claim 9 wherein said resiliently flexible gear teeth on said tooth ring exhibit resilient flexure to axially space from contact with said flat side of said worm gear without substantially compressing said pair of flanks of said resiliently flexible gear teeth when said worm teeth drive to engage a flank of said worm gear teeth for direct torque transfer between said worm and said worm gear.

* * * * *